Nov. 29, 1949 W. H. TUCKER 2,489,991
DIRT ELEVATOR ATTACHMENT
Filed Sept. 26, 1946 3 Sheets-Sheet 1
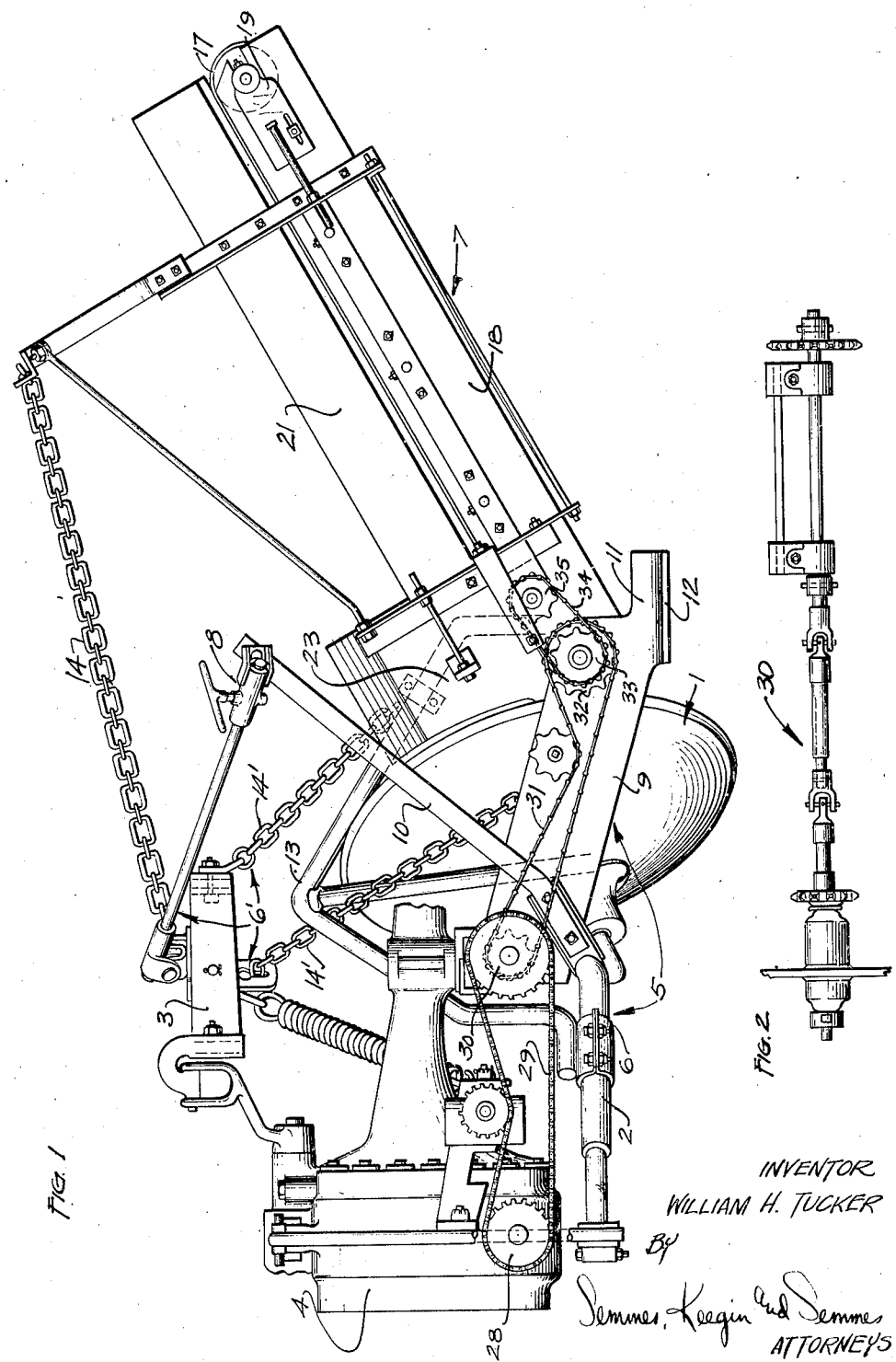
INVENTOR
WILLIAM H. TUCKER
ATTORNEYS Nov. 29, 1949 W. H. TUCKER 2,489,991
DIRT ELEVATOR ATTACHMENT
Filed Sept. 26, 1946 3 Sheets-Sheet 2
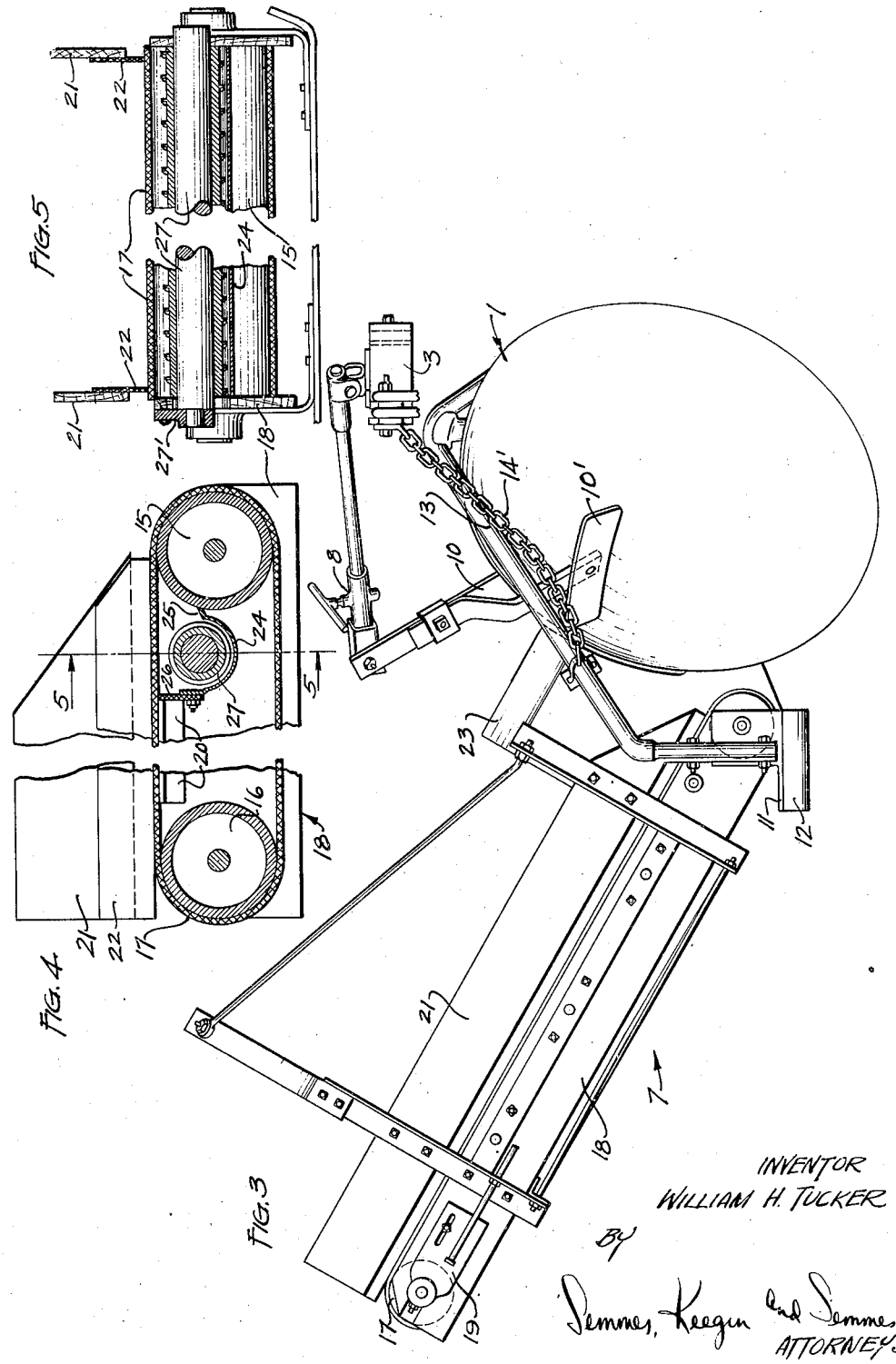
INVENTOR
WILLIAM H. TUCKER
BY
Semmes, Keegin and Semmes
ATTORNEYS Nov. 29, 1949  W. H. TUCKER  2,489,991
DIRT ELEVATOR ATTACHMENT
Filed Sept. 26, 1946  3 Sheets-Sheet 3
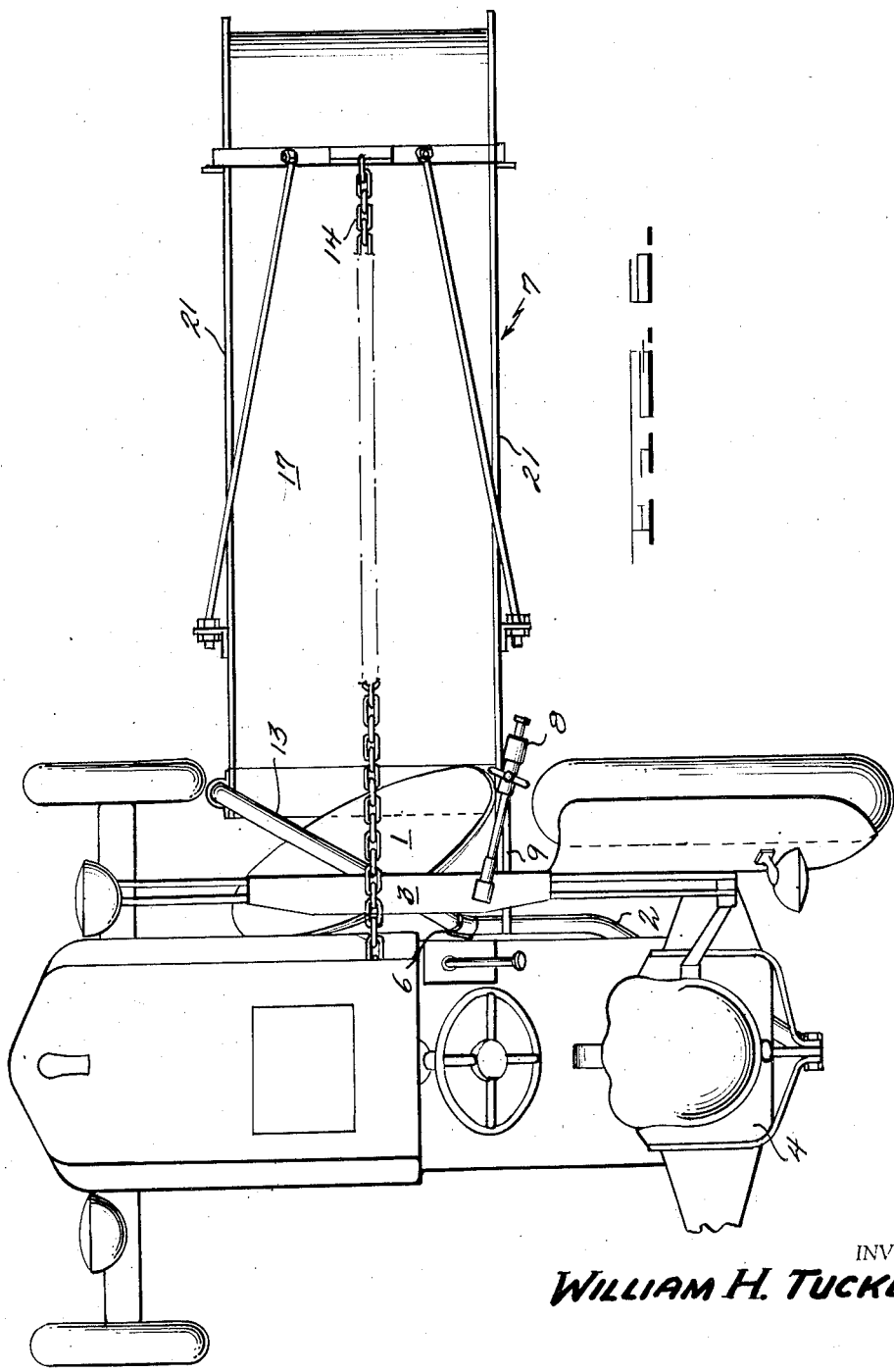
INVENTOR
WILLIAM H. TUCKER
BY
ATTORNEYS Patented Nov. 29, 1949

2,489,991

UNITED STATES PATENT OFFICE 2,489,991

DIRT ELEVATOR ATTACHMENT

William H. Tucker, Marion, Kans., assignor to Tucker's, Inc., Marion, Kans., a corporation Application September 26, 1946, Serial No. 699,401

3 Claims. (Cl. 37—110)

This invention relates to dirt elevators and more particularly to a dirt elevator attachment which can be mounted on a tractor having an earth digging implement.

Disc terracers are among the many types of apparatus used for terracing land as a means of land conservation. These disc terracers are rigidly attached to the tractor body so as to become a part of the tractor. Experience has shown that the disc alone is not sufficiently effective under all conditions, but that deficiency can be overcome by the use of a dirt elevator. A properly constructed elevator will maintain the efficiency of these tractor attachments in even the hardest and driest type of soil.

The dirt elevator of this invention is very effective for use for the purposes described. One of the marked advantages is its adaptability for use on small tractors. Hitherto dirt elevators have been pull-type machines requiring large track-laying tractors to pull them. They have had to have their own carriage and wheels and separate power units to operate and control them. They have had difficulty in turning sharply because they have not been built into their prime mover. They have been expensive per se and expensive to operate. In addition several persons have been required to operate such machines.

It is the primary object of this invention to provide a tractor dirt elevator attachment of such small compact size that one man can attach it and thereafter operate both the tractor and elevator at the same time.

Another object of this invention is to provide a tractor dirt elevator attachment which is supported entirely by the tractor and its digging implement, and which receives its operating power from the tractor.

Still another object of this invention is to provide a tractor dirt elevator for attachment to a disc terracer in such fashion that the elevator is adjusted and controlled coincidentally with the terracer.

Still a further object of this invention is to provide an improved dirt elevator in which the ground end of the elevator is completely protected and covered at the forward edge thereof, and in which improved means are provided to prevent the accumulation of material in the lower turn of the inclined elevator.

And a still further object of this invention is to provide an inexpensive, removably-mounted dirt elevator for tractors, which assists in more efficiently building terraces or drainage ditches.

Though there are other methods of attachment, by way of example, this disclosure specifies a tractor dirt elevator attached to a disc terracer. Unit design enables the dirt elevator attachment of this machine to be supported entirely by the tractor, eliminating the need for massive frame and wheels. Its small, compact size makes it a machine that one man can attach and detach from a tractor and handle in operation. By virtue of its location on the tractor the elevator is under positive control by the tractor driver at all times. The location of the elevator between the front and rear tractor wheels gives the operator exact control of the terrace location even on sharp curves. This structure enables the elevator to be turned in the tractor's own length, thus continuing the terraces up close to fences and simplifying the construction of short or intersecting terraces.

This dirt elevator is especially adapted to terracing in that it greatly decreases the number of trips along a particular course required to make a terrace, thereby cutting down the time and expense of construction. Furthermore, the efficiency of this elevator springs from the fact that it moves the dirt approximately seven feet from where it is cut loose and efficiently places the dirt on the terrace, saving the movement of the dirt many times.

With these advantages, the invention broadly embraces incorporating with an earth digging implement on a tractor, such as a disc terracer, a removably mounted dirt elevator with a novel internal dirt remover means and which is entirely supported by the implement and tractor together and receives its power through the tractor's power-take-off system.

In the accompanying drawings:

Figure 1 is a side elevational view of the dirt elevator attachment of this invention in applied position to a supporting tractor as seen from the rear of the tractor.

Figure 2 is a view of the main drive assembly.

Figure 3 is a side elevational view of the dirt elevator attachment as seen from the front of the tractor.

Figure 4 is a longitudinal sectional view of the dirt elevator of Figure 1.

Figure 5 is a cross sectional view of the dirt elevator taken along the line 5—5 of Figure 4.

Figure 6 is a plan view of a tractor showing the position of the elevator between the front and rear wheels of the tractor.

Similar reference characters refer to similar parts throughout the several views.

Referring specifically to the drawings, there is shown a well-known type of disc terracer 1 with an adjustable supporting arm 2 and frame member 3 for attachment to a tractor, the final drive housing of which is designated as 4. This type of terracer is positioned on one side of the tractor between the front and rear wheel thereof.

The dirt elevator attachment shown herein includes a removable supporting frame, designated generally as 5, comprising a lower attachment 6 fastened to the supporting arm 2, and an upper attachment 6' fastened to the frame member 3. Mounted for inclined movement with respect to the removable supporting frame is a dirt elevator 7.

The disc terracer 1 is controlled for depth through hydraulic control of its supporting arm 2. The pitch or disc angle adjuster 8 is set by hand. By virtue of the rigid attachment of the lower portion 6 of the supporting frame 5 to the terracer arm 2, the elevator 7 is moved as a unit with the disc terracer 1 as it is adjusted for working conditions. Thus the elevator itself is adjusted at the same time.

The suppotring frame 5 of the dirt elevator is constructed to be attached and detached from the disc terracer and tractor by one man. This frame has a main plate 9 secured to an adjusting bar 10. Plate 9 extends out to form a shoe 11 which stretches the width of the elevator 7 and in which the elevator is hinged so that its upper end may be raised and lowered. The shoe 11 projects out to form a protective plate 12 to engage the earth as the elevator advances over the ground. A supporting bar 13 passes over disc 1 to carry the forward edge of the shoe 11. Thus the bar 13 and the plate 9 give rigid base support to the elevator 7. The upper end of the elevator 7 is carried by a chain 14 fastened to frame member 3. The chain 14 also acts as a pitch adjustment chain to increase or decrease the inclination of elevator 7 for preferred working conditions. Chains 14' take some of the tension off of plate 9 and bar 13.

The dirt elevator 7 has a lower driving roller 15 and an upper idling roller 16, as shown in Figure 4. Stretched over these rollers is an endless belt 17 which may have intermediate idling rollers to support its central carrying portion. Side members 18 carry the rollers and provide a frame for the dirt elevator. The screw tightener and plate 19 serves to adjust the belt for proper operation. Angle irons 20, as shown in Figure 4, support the outer edges of the carrier belt at the top level of the rollers and cause sifting dirt to pass to the outside of the lower half of the elevator instead of into the rollers. Set in one inch from the edge of the lower side of the elevator and up one inch from the top side of the belt are sideboards 21 which form a trough for the dirt elevator. Secured to the insides of the sideboards 21 and extending downward to contact the carrier belt is a piece of flexible material 22 which allows nothing but dust to sift off of the elevator.

As shown in Figure 3, a spade 10' on adjusting bar 10 forces earth piling up on the disc 1 down onto the endless belt, and prevents earth from passing over the top of the disc. A shield 23 extending from the inside of the elevator trough to the edge of the lower roller and to the disc terracer 1 insures the material being cast on the belt as it piles up at the trailing section of the disc. This shield with the protective plate 12 prevents the passage of dirt directly into the lower roller from either the forward or trailing end thereof.

Regardless of the precaution taken, a certain amount of fine material will pass into the interior of the dirt elevator between the stretches of the endless belt. The accumulation of such material, especially if it is damp, between the lower roller and the endless belt will cause a jam and prevent the operation of the elevator. However, means are herein provided for loosening such material and ejecting it clear of the dirt elevator.

In order to accomplish this material ejecting operation, scraping and brushing means are provided in conjunction with a material accumulating pan and a screw conveyor. As seen in Figure 4, the semi-circular pan 24 constructed of sheet metal is formed at its forward edge to make a scraper 25 to engage and remove material from roller 15. To the rear edge of pan 24 is attached a piece of flexible material 26 which brushes dirt and dust from the under surface of the upper part of the endless belt. In this way all dirt is collected in a small space and confined to the pan 24. A screw conveyor 27 is positioned longitudinally within the pan 24 to discharge material accumulated therein. At its front end on the leading side of the dirt elevator the screw conveyor is supported by an ordinary bearing but at its rear end it is supported by a bearing hanger 27' which is positioned to give a substantially unobstructed passage from the pan 24 through a hole in the sideboard adjacent to and just forward of the end of the screw conveyor. Material collected in the pan 24 is immediately forced out through the rear side of the elevator by the screw conveyor. The front end of the conveyor means is closed and protected so that no dirt can enter.

The motive power for the dirt elevator is supplied entirely from the tractor itself through a power-take-off sprocket 28 at the rear of the tractor differential gear housing. An endless chain 29 transmits the power from sprocket 28 to a drive assembly 30 which extends from adjacent the rear axle of the tractor forward to the plate 9. A sprocket and chain drive 31 positioned on plate 9 further transmits power to lower roller driving sprocket 32, which drives the endless belt. Sprocket 33 runs chain 34 which drives the screw conveyor sprocket 35.

From the foregoing description it will be manifest that a dirt elevator attachment is provided which one man can own and operate, readily attaching and detaching from a farm tractor in a few minutes, and which has an improved means of ejecting earth from its operational parts. It is to be noted also that special precautions are taken to prevent the entry of dirt between the stretches of the endless belt including the shielding of the lower portion of the dirt elevator and the angle iron dirt throw-off under the edge of the carrier part of the belt.

I claim:

1. A terracer comprising a tractor having a power take-off and front and rear wheels, a plow, an arm secured to the tractor supporting the plow between the front and rear wheels of the tractor, said arm being adjustable to control the elevation of the plow, a frame rigidly secured to the arm having a shoe attached thereto, a conveyor receiving the dirt turned over by the plow having its lower end pivotally mounted in the frame above the shoe whereby the shoe and the lower end of the conveyor move integrally with the plow as the elevation of the plow is adjusted, means for adjusting the position of the upper end of the conveyor independently of its lower end, and power transmission means extending from the power take-off to the conveyor driving the conveyor to discharge dirt turned over by the plow from the upper end of the conveyor.

2. A terracer comprising a tractor having a power take-off and front and rear wheels, a plow, an arm secured to the tractor supporting the plow between the front and rear wheels of the tractor, said arm being adjustable to control the elevation of the plow, a frame rigidly secured to the arm, a conveyor receiving dirt turned over by the plow having its lower end pivotally mounted in the frame whereby the lower end of the conveyor moves integrally with the plow as the elevation of the plow is adjusted, means for adjusting the elevation of the upper end of the conveyor independently of its lower end and power transmission means connected to the power take-off driving the conveyor to discharge dirt turned over by the plow from the upper end of the conveyor.

3. A terracer comprising a tractor having a power take-off, a hydraulic system, and front and rear wheels, a plow, an arm connected to the hydraulic system of the tractor supporting the plow between the front and rear wheels of the tractor, said arm being adjustable by the hydraulic system of the tractor to control the elevation of the plow, a frame secured to the arm, a conveyor for receiving dirt turned over by the plow having its lower end pivotally mounted in the frame whereby the lower end of the conveyor moves integrally with the plow as the elevation of the plow is adjusted, means for adjusting the position of the upper end of the conveyor independently of its lower end, and power transmission means connected from the power take-off to the conveyor to drive the conveyor and discharge dirt turned over by the plow from the upper end of the conveyor.

WILLIAM H. TUCKER.

REFERENCES CITED

The following references are of record in the file of this patent:

UNITED STATES PATENTS

| Number | Name | Date |
|---|---|---|
| 897,955 | Barrett et al. | Sept. 8, 1908 |
| 1,015,004 | Chounard | Jan. 16, 1912 |
| 1,429,563 | Benning | Sept. 19, 1922 |
| 1,658,354 | Ronning et al. | Feb. 7, 1928 |
| 1,767,992 | Lilly | June 24, 1930 |
| 2,000,072 | Gedstad | May 7, 1935 |
| 2,089,319 | Wooley et al. | Aug. 10, 1937 |
| 2,113,941 | Gustafson | Apr. 12, 1938 |
| 2,248,709 | Jarmin | July 8, 1941 |
| 2,280,473 | Brown | Apr. 21, 1942 |